(12) United States Patent
Kotecha et al.

(10) Patent No.: US 8,909,159 B2
(45) Date of Patent: Dec. 9, 2014

(54) CHANNEL RANK FEEDBACK IN MULTIPLE-INPUT MULTIPLE-OUTPUT COMMUNICATION SYSTEMS

(71) Applicant: Apple Inc., Cupertino, CA (US)

(72) Inventors: Jayesh H. Kotecha, Austin, TX (US); James W. McCoy, Austin, TX (US)

(73) Assignee: Apple Inc., Cupertino, CA (US)

( * ) Notice: Subject to any disclaimer, the term of this patent is extended or adjusted under 35 U.S.C. 154(b) by 207 days.

(21) Appl. No.: 13/657,687

(22) Filed: Oct. 22, 2012

(65) Prior Publication Data

US 2013/0044714 A1    Feb. 21, 2013

Related U.S. Application Data

(63) Continuation of application No. 12/351,273, filed on Jan. 9, 2009, now Pat. No. 8,295,778.

(60) Provisional application No. 61/020,596, filed on Jan. 11, 2008.

(51) Int. Cl.
| | |
|---|---|
| *H04B 1/00* | (2006.01) |
| *H04B 7/00* | (2006.01) |
| *H04B 7/04* | (2006.01) |
| *H04B 7/06* | (2006.01) |
| *H04L 1/16* | (2006.01) |
| *H04L 25/02* | (2006.01) |
| *H04W 72/04* | (2009.01) |
| *H04W 52/42* | (2009.01) |
| *H04L 25/03* | (2006.01) |
| *H04W 24/10* | (2009.01) |
| *H04W 48/08* | (2009.01) |

(52) U.S. Cl.
CPC ......... *H04B 7/0417* (2013.01); *H04W 72/0413* (2013.01); *H04W 52/42* (2013.01); *H04B 7/0408* (2013.01); *H04B 7/0486* (2013.01); *H04B 7/0413* (2013.01); *H04B 7/063* (2013.01); *H04B 7/0636* (2013.01); *H04B 7/0647* (2013.01); *H04L 1/1671* (2013.01); *H04L 25/0204* (2013.01); *H04L 25/0228* (2013.01); *H04L 25/0242* (2013.01); *H04L 25/03343* (2013.01); *H04L 2025/03414* (2013.01); *H04L 2025/03426* (2013.01); *H04W 24/10* (2013.01); *H04W 48/08* (2013.01)
USPC ....... 455/69; 455/450; 455/452.1; 455/452.2; 455/63.1; 455/67.13; 455/68; 375/260; 375/267; 375/296; 375/308; 375/340; 375/347; 375/367

(58) Field of Classification Search
CPC .. H04B 7/0456; H04B 7/0408; H04B 7/0413; H04B 7/063; H04B 7/0417; H04B 7/0486; H04B 7/0626; H04B 7/0478; H04W 52/42; H04W 24/10; H04W 72/0413; H04W 24/00; H04W 24/02; H04L 2025/03426
USPC .................. 455/450, 451, 452.1, 452.2, 63.1, 455/67.13, 69; 375/260, 267, 308, 340, 375/347, 367, 296; 370/203, 208, 328, 329, 370/335, 336, 337, 343, 344
See application file for complete search history.

(56) References Cited

U.S. PATENT DOCUMENTS 7,649,831 B2 *   1/2010   Van Rensburg et al. ...... 370/203
7,693,100 B2 *   4/2010   Cho et al. ...................... 370/328

(Continued)

*Primary Examiner* — Olumide T Ajibade Akonai
(74) *Attorney, Agent, or Firm* — Paradigm IP Law, PC; Ross L. Franks

(57) ABSTRACT

Embodiments of a system and methodology are disclosed for aperiodic (i.e., non-periodic) feedback of channel-side information, such as channel rank information, to a base station by having the receiver/UE initiate the feedback instead of using a scheduled feedback approach. The autonomous feedback of channel-side information may use one of several different types of physical channel structures for uplink scheduling requests, such as those being discussed for inclusion in the emerging LTE platform standard.

19 Claims, 5 Drawing Sheets

(56) References Cited

U.S. PATENT DOCUMENTS

| | | | |
|---|---|---|---|
| 7,729,442 B2 * | 6/2010 | Kim et al. | 375/295 |
| 7,944,985 B2 * | 5/2011 | ElGamal et al. | 375/267 |
| 8,699,587 B2 * | 4/2014 | Blanz et al. | 375/260 |
| 2008/0045228 A1 * | 2/2008 | Zhang et al. | 455/450 |
| 2008/0232449 A1 * | 9/2008 | Khan et al. | 375/220 |
| 2008/0253336 A1 * | 10/2008 | Parkvall et al. | 370/335 |

\* cited by examiner

CHANNEL RANK FEEDBACK IN MULTIPLE-INPUT MULTIPLE-OUTPUT COMMUNICATION SYSTEMS

This application is a continuation of and claims priority to co-owned U.S. patent application Ser. No. 12/351,273, filed Jan. 9, 2009, and entitled "CHANNEL RANK FEEDBACK IN MULTIPLE-INPUT MULTIPLE-OUTPUT COMMUNICATION SYSTEMS", issuing as U.S. Pat. No. 8,295,778, which claims priority to U.S. Provisional Application Ser. No. 61/020,596, filed Jan. 11, 2008, entitled "CHANNEL RANK FEEDBACK IN MULTIPLE-INPUT MULTIPLE-OUTPUT COMMUNICATION SYSTEMS", each of the foregoing incorporated herein by reference in its entirety.

BACKGROUND OF THE INVENTION

1. Field of the Invention

The present invention is directed in general to the field of information processing. In one aspect, the present invention relates to a system and method for transmitting channel rank feedback information from one or more receivers.

2. Description of the Related Art

Wireless communication systems transmit and receive signals within a designated electromagnetic frequency spectrum, but capacity of the electromagnetic frequency spectrum is limited. As the demand for wireless communication systems continues to expand, there are increasing challenges to improve spectrum usage efficiency. To improve the communication capacity of the systems while reducing the sensitivity of the systems to noise and interference and limiting the power of the transmissions, a number of wireless communication techniques have been proposed, such as Multiple input Multiple Output (MIMO), which is a transmission method involving multiple transmit antennas and multiple receive antennas. Such wireless communication systems are increasingly used to distribute or "broadcast" audio and/or video signals (programs) to a number of recipients ("listeners" or "viewers") that belong to a large group. An example of such a wireless system is the 3GPP LTE (Long Term Evolution) system depicted in FIG. 1, which schematically illustrates the architecture of an LTE wireless communication system 1. As depicted, the broadcast server 28 communicates through an EPC 26 (Evolved Packet Core) which is connected to one or more access gateways (AGW) 22, 24 that control transceiver devices, 2, 4, 6, 8, which communicate with the end user devices 10-15. In the LTE architecture, the transceiver devices 2, 4, 6, 8 may be implemented with base transceiver stations (referred to as enhanced Node-B or eNB devices) which in turn are coupled to Radio Network Controllers or access gateway (AGW) devices 22, 24 which make up the UMTS radio access network (collectively referred to as the UMTS Terrestrial Radio Access Network (UTRAN)). Each transceiver device 2, 4, 6, 8 device includes transmit and receive circuitry that is used to communicate directly with any mobile end user(s) 10-15 located in each transceiver device's respective cell region. Thus, transceiver device 2 includes a cell region 3 having one or more sectors in which one or more mobile end users 13, 14 are located. Similarly, transceiver device 4 includes a cell region 5 having one or more sectors in which one or more mobile end users 15 are located, transceiver device 6 includes a cell region 7 having one or more sectors in which one or more mobile end users 10, 11 are located, and transceiver device 8 includes a cell region 9 having one or more sectors in which one or more mobile end users 12 are located. With the LTE architecture, the eNBs 2, 4, 6, 8 are connected by an S1 interface to the EPC 26, where the S1 interface supports a many-to-many relation between AGWs 22, 24 and the eNBs 2, 4, 6, 8.

As will be appreciated, each transceiver device, e.g., eNB 2, in the wireless communication system 1 includes a transmit antenna array and communicates with receiver device, e.g., user equipment (UE) 15, having a receive antenna array, where each antenna array includes one or more antennas. The wireless communication system 1 may be any type of wireless communication system, including but not limited to a MIMO system, SDMA system, CDMA system, SC-FDMA system, OFDMA system, OFDM system, etc. Of course, the receiver/subscriber stations, e.g., UE 15, can also transmit signals which are received by the transmitter/base station, e.g., eNB 2. The signals communicated between transmitter 102 and receiver 104 can include voice, data, electronic mail, video, and other data, voice, and video signals.

Various transmission strategies require the transmitter to have some level of knowledge concerning the channel response between the transmitter and each receiver, and are often referred to as "closed-loop" systems. An example application of closed-loop systems which exploit channel-side information at the transmitter ("CSIT") are precoding systems, such as space division multiple access (SDMA), which use closed-loop systems to improve spectrum usage efficiency by applying precoding at the transmitter to take into account the transmission channel characteristics, thereby improving data rates and link SDMA based methods have been adopted in several current emerging standards such as IEEE 802.16 and the 3rd Generation Partnership Project (3GPP) Long Term Evolution (LTE) platform. With such precoding systems, CSIT can be used with a variety of communication techniques to operate on the transmit signal before transmitting from the transmit antenna array. For example, preceding techniques can provide a multi-mode beamformer function to optimally match the input signal on one side to the channel on the other side. In situations where channel conditions can be provided to the transmitter, closed loop methods, such as MIMO preceding, can be used. Preceding techniques may be used to decouple the transmit signal into orthogonal spatial stream/beams, and additionally may be used to send more power along the beams where the channel is strong, but less or no power along the weak, thus enhancing system performance by improving data rates and link reliability. In addition to multi-stream transmission and power allocation techniques, adaptive modulation and coding (AMC) techniques can use CSIT to operate on the transmit signal before transmission on the transmit array.

With conventional closed-loop MIMO systems, full broadband channel knowledge at the transmitter may be obtained by using uplink sounding techniques (e.g., with Time Division Duplexing (TDD) systems). Alternatively, channel feedback techniques can be used with MIMO systems (e.g., with TDD or Frequency Division Duplexing (FDD) systems) to feed back channel information to the transmitter.

Current proposals for providing channel rank feedback in LTE systems use periodic feedback methods for the downlink MIMO channel whereby the feedback period is controlled by the base station and is signaled to the user. However, there are several problems associated with periodic feedback. For example, there are difficulties in regulating the feedback period creating overhead loss in channel rank feedback and/or loss in performance. Furthermore, delays in identifying changes in the rank of the downlink channel by the base station can lead to catastrophic (several in succession) errors, thereby severely degrading performance.

Another problem related to channel rank information in MIMO systems is the uncertainty regarding whether a channel rank request sent by a UE is actually received by the Node B. In a MIMO system, when the UE feeds back the MIMO channel rank to the Node B, the Node B can always override the rank request and transmit to the UE at a lower rank. In this case, the UE does not know whether there was an error in channel rank feedback, in which case it can resend the rank feedback, or whether the transmitter decided to override the rank request. In some MIMO systems, this lack of information may cause the UE to unnecessarily resend the rank feedback thereby increasing uplink overhead.

Accordingly, an efficient feedback methodology is needed to provide the channel rank information to the transmitter while sustaining a minimal loss in link performance. In addition, there is a need for a methodology to provide an indication to the UE of an override of a rank request. Further limitations and disadvantages of conventional processes and technologies will become apparent to one of skill in the art after reviewing the remainder of the present application with reference to the drawings and detailed description which follow.

BRIEF DESCRIPTION OF THE DRAWINGS

The present invention may be understood, and its numerous objects, features and advantages obtained, when the following detailed description of a preferred embodiment is considered in conjunction with the following drawings, in which.

Figure 1:
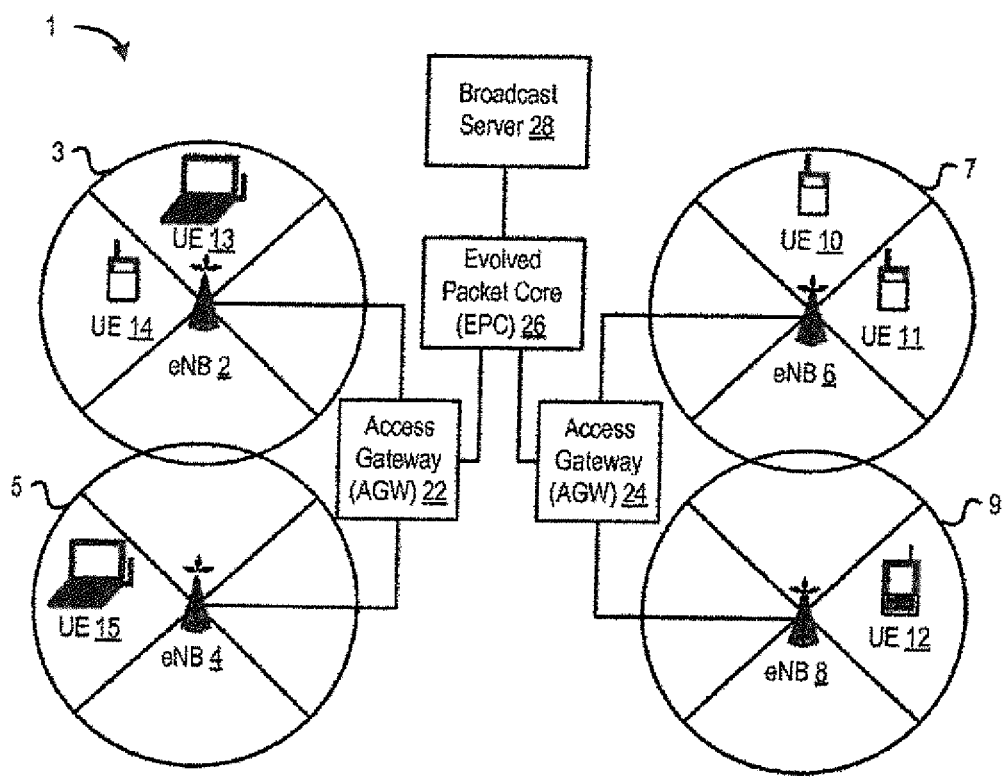
FIG. 1 schematically illustrates the architecture of an LTE wireless communication system.

It will be appreciated that for simplicity and clarity of illustration, elements illustrated in the drawings have not necessarily been drawn to scale. For example, the dimensions of some of the elements are exaggerated relative to other elements for purposes of promoting and improving clarity and understanding. Further, where considered appropriate, reference numerals have been repeated among the drawings to represent corresponding or analogous elements.

DETAILED DESCRIPTION

Embodiments of a system and methodology are disclosed for aperiodic (i.e., non-periodic) feedback of channel-side information, such as channel rank information, to a base station by having the receiver/UE initiate the feedback instead of using a scheduled feedback approach. As will be appreciated, the autonomous feedback of channel-side information may use one of the different types of physical channel structures for uplink scheduling requests, such as those being discussed for inclusion in the emerging LTE platform standard. At the base station, the feedback signal is received over one or more antennas, and the channel side information is extracted and used to precode the transmission signals. For example, instead of using a scheduled channel rank feedback scheme, selected embodiments of the present invention allow the receiver/UE to determine when channel rank feedback should be generated by using any performance-based metric, thereby reducing the average feedback rate. In some embodiments, channel rank feedback information is generated and reported only when the receiver/UE determines that there has been a significant change in the channel rank. However, if the receiver/UE determines that there has been no "significant" change in the channel rank, then no channel rank feedback is performed. In each of the embodiments described herein, the channel rank feedback information is sent to the base station through the feedback control channel where it is processed to regenerate the original channel rank state information and is used for scheduling and adaptive modulation control (AMC). As used herein, channel rank is related to the number of parallel channels available to transfer information between a base station and a predetermined UE. In various embodiments of the invention as described herein, a channel rank feedback report from the receiver/UE will be understood to constitute a request by the receiver/UE to use a predetermined channel rank.

Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art. Various illustrative embodiments of the present invention will now be described in detail below with reference to the figures.

Figure 2:
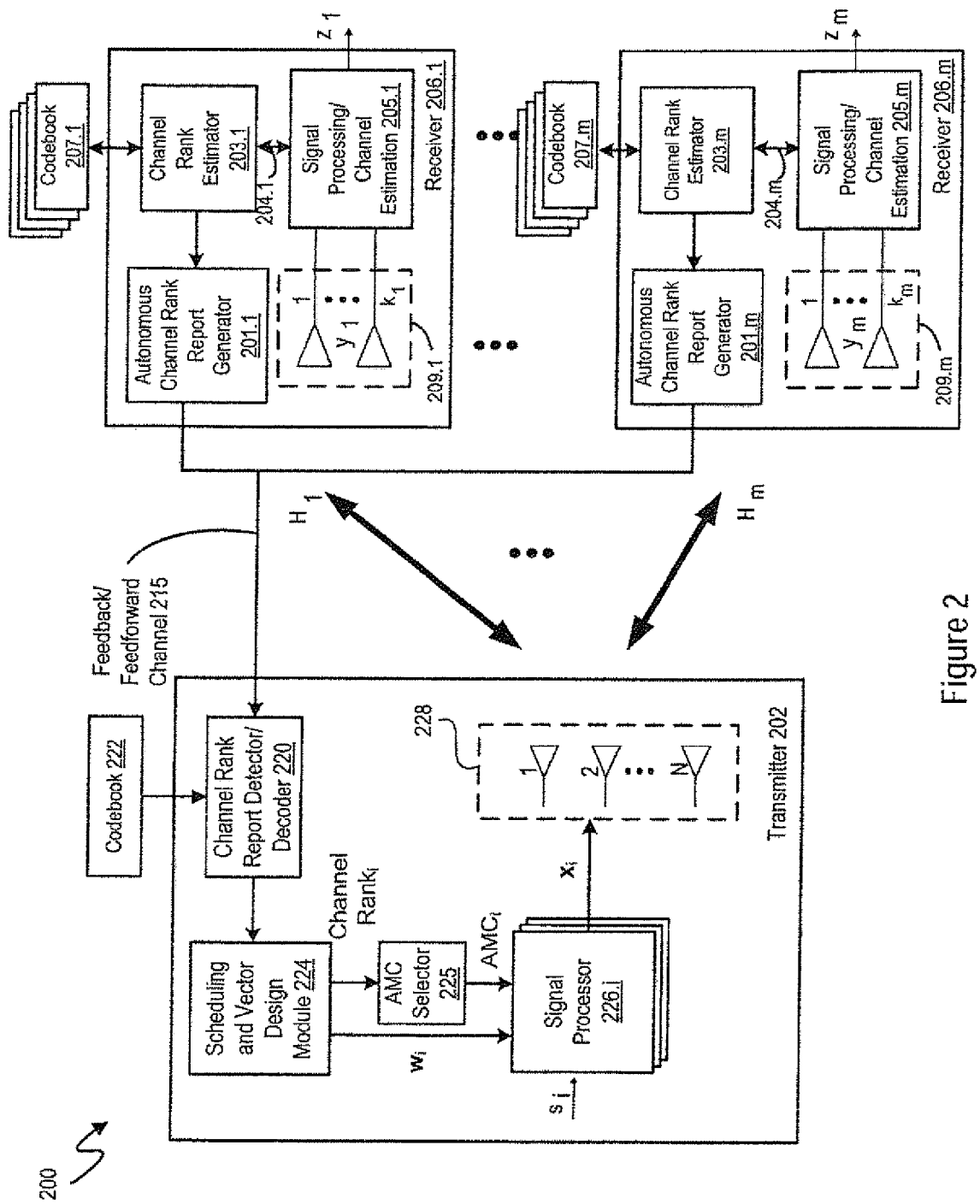
FIG. 2 depicts a wireless communication system in which one or more receiver stations autonomously feed back information to a transmitter station for use in scheduling or otherwise preceding signal transmissions by the transmitter station.

FIG. 2 depicts a wireless communication system 200 in which a transmitter station 202 communicates with one or more receiver stations 204.i. With reference to the LIE wireless system depicted in FIG. 1, the transmitter 202 may represent any of the control transceiver devices, 2, 4, 6, 8 which act as a base station, while the receiver 204.i may represent any of the end user devices 10-15. In the system 200 depicted in FIG. 2, one or more receiver stations 206.i autonomously feed back channel rank information over a feedback channel 215 to a transmitter station 202 for use in scheduling or otherwise precoding signal transmissions by the transmitter station 202. As will be discussed in greater detail hereinbelow, each receiver station 206.i monitors its channel conditions and reports on a predetermined channel (such as a physical LTE feedback channel that supports channel rank reporting) when there has been an important change in the channel rank conditions. At the transmitter 202, the random channel rank channel is decoded to extract the autonomously generated channel rank feedback information, which is used to configure or adapt one or more input signals that are transmitted from a transmitter 202 (e.g., a base station) to one or more receivers 206.1-$m$ (e.g., subscriber stations). As will be appreciated, the transmitter station 202 and/or receiver stations 206.$i$ include a processor, software executed by the processor, and other hardware that allow the processes used for communication and any other functions performed by the transmitter station 202 and each of receiver stations 206.$i$. It will also be appreciated that the transmitter station 202 can both transmit signals (over the downlink path) and receive signals (over the uplink path), and that each receiver station 204.$i$ can receive signals (over the downlink path) and transmit signals (over the uplink path).

The transmitter 202 includes an array 228 of one or more antennas for communicating with the receivers 206.1 through 206.$m$, each of which includes an array 209.$i$ having one or more antennas for communicating with the transmitter 202. In operation, a data signal $s_i$ presented at the transmitter 202 for transmission to the receiver 204.$i$ is transformed by the signal processor 226.$i$ into a transmission signal, represented by the vector $x_i$. The signals transmitted from the transmit antenna 228 propagate through a matrix channel $H_i$ and are received by the receive antennas 209.$i$ where they are represented by the vector $y_i$. For a MIMO channel from the transmitter 202 to the $i^{th}$ receiver 206.$i$, the channel is denoted by $H_i$, $i \in \{1, 2, \ldots, m\}$. The channel matrix $H_i$ may be represented as a $k_i \times N$ matrix of complex entries representing the complex coefficients of the transmission channel between each transmit-receive antenna pair, where N represents the number of transmit antennas in the transmit antenna array 228, and $k_i$ represents the number of antennas of the $i^{th}$ receiver 206.$i$. At the receiver 206.$i$, the signal processing unit 205.$i$ processes the $y_i$ signals received on the k antennas to obtain a data signal, $z_i$, which is an estimate of the transmitted data $s_i$. The processing of the received $y_i$ signals may include combining the $y_i$ signals with appropriate combining vector information $v_i$ retrieved from the codebook 207.$i$ or otherwise computed by the receiver's signal processing unit 205.$i$.

Precoding for downlink transmissions (transmitter to receiver) may be implemented by having each receiver 206.$i$ determine its MIMO channel matrix $H_i$—which specifies the profile of the transmission channel between a transmitter and an $i^{th}$ receiver—in the channel estimation signal processing unit 205.$i$. For example, in a MIMO implementation, each receiver 206.1-$m$ determines its MIMO channel matrix $H_i$ by using pilot estimation or sounding techniques to determine or estimate the coefficients of the channel matrix $H_i$. Each receiver 206.$i$ uses the estimated MIMO channel matrix or other channel-related information (which can be channel coefficients or channel statistics or their functions, such as a precoder, a beamforming vector or a modulation order) to generate precoding information, such as precoding and power allocation values, appropriate for the MIMO channel matrix. This may be done by using the channel-related information to access a precoder stored in the receiver codebook 207.$i$. In addition, each receiver 206.$i$ uses the estimated MIMO channel matrix or other channel-related information to generate channel rank information that is to be used to configure/adapt the signals transmitted by the transmitter.

In one embodiment, the autonomous channel rank report generator 201.$i$ may include logic and/or circuitry for detecting a change in the mode of operation of the receiver 206.$i$ (e.g., from a single-antenna mode of operation to a multi-antenna mode of operation) so that channel rank information is generated and reported to the transmitter 202 via the feedback channel 215 only when such a mode change is detected.

Rather than feeding back the full channel rank representation, the receiver 206.$i$ may use a codebook 207.$i$ to compress or quantize the transmission profile (e.g., channel rank information) that is generated from the detected channel information and that can be used by the transmitter in controlling signal transmission to the receiver. The channel rank estimator 203.$i$ generates a quantization/codebook index by accessing the receiver codebook 207.$i$ which stores an indexed set of possible transmission profiles and/or channel matrices $H_i$ along with associated channel rank information so that the estimated channel matrix information 204.$i$ generated by the signal processing unit 205.$i$ can be used by the channel rank estimator 203.$i$ to retrieve a codebook index from the codebook 207.$i$. The output of the channel rank estimator 203.$i$ is provided to an autonomous channel rank report generator 201.$i$ that is operable to independently decide when to generate and feedback channel rank reports. For example, the autonomous channel rank report generator 201.$i$ may include a channel rank transition detector that detects a change in the channel rank information that meets a predetermined change threshold requirement so that channel rank information is generated and reported to the transmitter 202 via the feedback channel 215 only when the predetermined change threshold requirement is met. In another example, the autonomous channel rank report generator 201.$i$ may include logic and/or circuitry for detecting a change in the mode of operation of the receiver 206.$i$ (e.g., from a single-antenna mode of operation to a multi-antenna mode of operation) so that channel rank information is generated and reported to the transmitter 202 via the feedback channel 215 only when such a mode change is detected.

The autonomously generated channel rank information is transmitted via the feedback channel 215 to the transmitter 202 where it may be stored and/or processed by the channel rank report detector/decoder 220. For example, a memory controller (not shown) in the channel rank report detector/decoder 220 may be used to update the previously reported channel rank information, either directly or using channel rank information retrieved from the codebook 222. In this way, the channel rank report detector/decoder 220 is operable to process the autonomously generated channel rank information to provide channel rank information that can be used by scheduling module 224 and AMC selection module 225 to generate scheduling or AMC information, respectively, for a particular receiver 206.$i$. As will be appreciated, the scheduling module 224 may be used to dynamically control which time/frequency resources are allocated to a certain receiver/UE 206.$i$ at a given time. Downlink control signaling informs each receiver/UE 206.$i$ what resources and respective transmission formats have been allocated. The scheduling module 224 can instantaneously choose the best multiplexing strategy from the available methods (e.g., frequency localized or frequency distributed transmission). The flexibility in selecting resource blocks and multiplexing users will influence the available scheduling performance.

Figure 3:
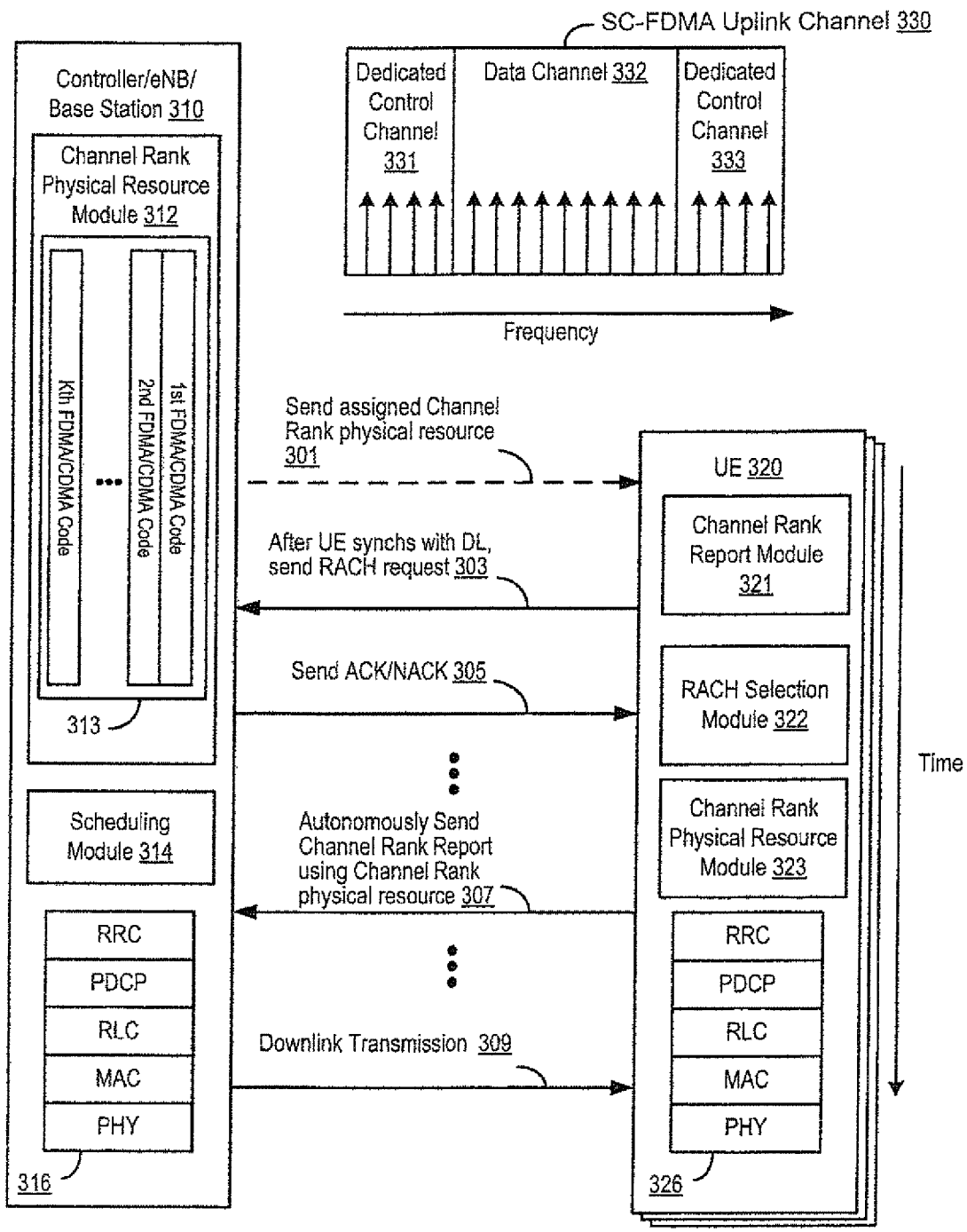
FIG. 3 illustrates an example signal flow for multiplexing autonomous user feedback to a transmitter station.

FIG. 3 illustrates an example signal flow for a user feedback procedure between one or more user devices 320 (such as a mobile device, subscriber station or other UE device) and a controller device 310 (such as an eNB, controller or base station) which exchange messages using protocol stacks 316, 326 at the controller and user device, respectively. In accordance with selected embodiments, the UE 320 includes a channel rank report module 321 which is used to autonomously generate channel rank reports upon detecting important changes in the channel rank information detected at the UE 320. To the extent that the channel rank report module 321 determines when channel rank reports will be fed back to the controller device 310, the feedback may be considered random or autonomous, as opposed to a scheduled or predetermined basis for feeding back channel rank information.

Once the channel rank report module 321 determines that a channel rank report should be fed back, the UE 320 must feed back the channel rank report over an appropriate channel that supports UE-autonomous channel rank reporting. As described herein, the feedback channel, which is referred to as the channel rank physical resource, is advantageously implemented in whole or in part as part of the uplink control channel so that multiple UE devices 320 can autonomously provide channel rank reports. For example, with LTE communications systems, the uplink transmission scheme for FDD and TDD mode is based on Single Carrier Frequency Division Multiple Access (SC-FDMA) with cyclic prefix because SC-FDMA signals have better peak-to-power ratio (PAPR) properties compared to an orthogonal Frequency Division Multiple Access (OFDMA) signal. An example of an appropriate uplink channel is the SC-FDMA feedback channel 330 depicted in FIG. 3. As depicted, the SC-FDMA feedback channel 330 includes a central region of resource blocks that define a data channel region 332 which is used to convey feedback data. In addition, the SC-FDMA feedback channel 330 includes edge of band resource blocks that define dedicated control regions 331, 333 which are used to convey uplink control information, such as data non-associated control information. In accordance with selected embodiments of the present invention, the SC-FDMA uplink channel 330 is used to feed back channel rank reports using the outer control channel frequencies 331, 333. For example, by sending channel rank reports as part of the data non-associated control information, the channel rank reports of different UEs can be multiplexed using the frequency/time/code domain or a hybrid of them within the assigned time-frequency region. With this approach, if the UE 320 has data to feed back, the channel rank report can be conveyed as data non-associated control information that is piggy backed on the data channel region 332. However, if there is no data to feed back from the UE 320, the channel rank report can be conveyed as data non-associated control information that is fed back in the outer frequency regions 331, 333. As a result, channel rank reports may be fed back by a UE 320 using data non-associated control multiplexing with uplink data and without uplink data. In yet another embodiment, there may be occasions when the UE 320 has an acknowledge/negative-acknowledge (ACK/NACK) signal to transmit on the uplink channel at the same time as a channel rank report (or other channel feedback information) is to be fed back. By using the data non-associated control information for such feedback, the channel rank reports can be embedded, or "piggy backed," in an ACK/NACK signal on an uplink channel. In various embodiments of the invention, rank feedback is signaled over the ACK/NACK channelization by reserving at least one channelization for use of rank feedback. This channelization corresponds to an a priori chosen set of parameters including cyclic shift and orthogonal cover.

Various embodiments of the invention provide a methodology wherein a base-station/NodeB enabled to blindly decode rank information from uplink control channel by searching for channel rank information embedded in ACK/NACK or sounding reference signal (SRS) message, or decoding it from a scheduling request message. Some embodiments of the present invention provide a UE-controlled channel rank methodology which essentially modifies the current LTE structure for ACK/NACK transmission. In various embodiments of the invention, this methodology can be periodic or aperiodic. In an embodiment of the invention at least one of the ACK/NACK channelizations are reserved for rank feedback while two bits of information (4 possible ranks for 4×4 MIMO) are encoded with the QPSK modulation symbol used for modulating the ACK/NACK sequences. By using this methodology, the channel rank feedback is at least as reliable as ACK/NACK feedback. In some embodiments, the channel rank feedback is embedded in the downlink ACK/NACK transmission using the same channelization. In another embodiment, the channel rank feedback is embedded in an uplink SRS signal using the same channelization. In these two methodologies, extra overhead is eliminated by embedding channel rank information in a scheduled message. In some embodiments of the invention, the channel rank feedback is embedded only if the UE elects to send a message. In yet another embodiment of the invention, channel rank feedback is encoded with an uplink scheduling request by the UE. The uplink scheduling request is necessarily tied to a UE ID message since it is transmitted on a random access channel.

The ACK/NACK and SRS messages are used in the aforementioned embodiments because of reliability. Those of skill in the art will appreciate that it is possible to embed the channel rank feedback information in other signaling messages. Furthermore, those of skill in the art will appreciate that the three embodiments discussed above can be used in conjunction.

In various embodiments of the invention, rank feedback consisting of 1 or 2 bits (2/4 possible ranks for 2/4 transmit antennas) is fed back using QPSK symbols used for modulating the uplink control channel sequences. In some embodiments, a repetition factor of "two" is used in the case of coverage limited UEs to ensure the same reliability for channel rank feedback as for ACK/NACK. In embodiments implemented using two transmit antennas, repetition is used to encode 1 bit in a QPSK symbol. In embodiments implemented using four transmit antennas the 2 bit is encoded in a QPSK symbol.

As described herein, the channel rank physical resource used to provide channel rank feedback may be directly assigned or broadcast to each UE 320 by the controller 310, or may be indirectly derived at each UE 320. For example, the controller 310 may generate and broadcast a semi-statically assigned physical resource to define the uplink feedback channel which is used by all UEs 320 in the cell region to autonomously feed back channel feedback information. The assigned physical resource may be used on a contention basis, on a synchronized RACH basis, on some hybrid basis or in any way desired to support random feedback over the uplink control channel. In selected embodiments, the channel rank physical resources used by each UE 320 should be selected to promote multiplexed feedback of channel rank reports. To this end, a channel rank physical resource module 312 at the controller 310 implements a multiplexing scheme by constructing and assigning a channel rank physical resource over which the UEs 320 can multiplex feedback signaling information to the controller 310. In an example implementation, the channel rank physical resource module 312 at the controller 310 uses code and/or frequency information to demultiplex the feedback signaling information from the UEs 320, though other demultiplexing techniques may be used. However constructed, the demultiplexing code and/or frequency information may be stored at the controller 310 in a data structure, such as a channel rank physical resource map 313 in which distinct FDMA/CDMA codes are assigned to each channel rank physical resource. When the controller 310 identifies one or more UEs 320 which are in communication with the controller 310, the map 313 may be populated with code and/or frequency information (e.g., 1st FDMA/CDMA Code) that the controller 310 uses to demultiplex autonomously generated channel rank reports that are fed back over the channel rank physical resource in the uplink message 306 from the UEs 320.

Once the controller 310 defines or specifies the channel rank physical resource to be used for autonomous feedback by the UEs 320, the channel rank physical resource is included as access information in the downlink message 301 that assigns the channel rank physical resource to the UE 320. Using the assigned channel rank physical resource, the UE 320 autonomously feeds back a channel rank report in an uplink message 307 that is sent on a non-scheduled basis so that UE 320 determines when feedback is required. The autonomous nature of channel rank reporting may be implemented by including at each UE 320 a channel rank report module 321 that includes logic and/or circuitry for detecting important changes to the channel rank information or to the mode of UE operation. As channel rank reports are received at the controller 310, the channel rank physical resource module 312 decodes the channel rank reports using the code and/or frequency information (e.g., 1st FDMA/CDMA Code) that is stored in the map 313. The scheduling module 314 uses the assembled channel rank information from the UEs 320 to generate scheduling or AMC information which is used to transmit downlink messages 309 to each UE 320. For example, the scheduling module 314 can use the assembled channel rank information for a variety of different purposes, including time/frequency selective scheduling, selection of modulation and coding scheme, interference management, and transmission power control for physical channels (e.g., physical/L2-control signaling channels).

In another example embodiment, after the controller 310 assigns and distributes the channel rank physical resource information for autonomous feedback of channel feedback information (with downlink message 301), each UE 320 synchronizes with the downlink channel, transitions from an idle mode to a connected mode, and selects a random access channel (RACH) feedback channel for communicating with a controller 310 (or a network). To this end, each UE 320 includes a RACH selection module 322 for accessing a contention-based RACH in an SC-FDMA system. In operation, the RACH selection module 322 randomly selects a physical resource for the RACH channel by obtaining RACH control parameters after performing a successful cell search. The RACH selection module 322 generates a RACH request which is included in the uplink message 303. As needed, the RACH requests may be repeated as necessary until the controller 310 returns an acknowledgement signal (ACK) or a no-acknowledgement signal (HACK) in a downlink message 305, signifying whether the RACH request is accepted. After an ACK signal is received in a downlink message 305, the UE 320 uses the previously-assigned channel rank physical resource to autonomously feed back channel feedback information (such as a channel rank report) in an uplink message 307 by using the channel rank report module 321 to determine when feedback is required. As channel rank reports are received at the controller 310, the channel rank physical resource module 312 is able to decode the channel rank reports fed back over the channel rank physical resource from the UEs 320. For example, once the controller 310 has received a RACH request 303 and acknowledged the request with an ACK signal 305, the channel rank physical resource module 312 has all the information required to demultiplex and extract a channel rank feedback report received over the channel rank physical resource, such as using a table lookup or map 313. The scheduling module 314 uses the assembled channel rank information from the UEs 320 to generate scheduling or AMC information which is used to transmit downlink messages 309 to each UE 320.

As described herein, the channel rank physical resources used by a UE 320 to autonomously feed back channel rank information may be implemented as a physical channel that is contention-based, or by expanding the allocation of an existing synchronized random access channel. With contention-based feedback channels, there is always the possibility that multiple UE devices 320 will be mapped to the same channel rank physical resource, but this risk is deemed sufficiently low because channel rank reports are fed back only when a UE 320 detects a change in the UE status and because the resource will be appropriately dimensioned by the network. On the other hand, with synchronized RACH feedback, each UE may be assigned a unique time slot so that each UE device 320 will be mapped to a unique channel rank physical resource.

Figure 4:
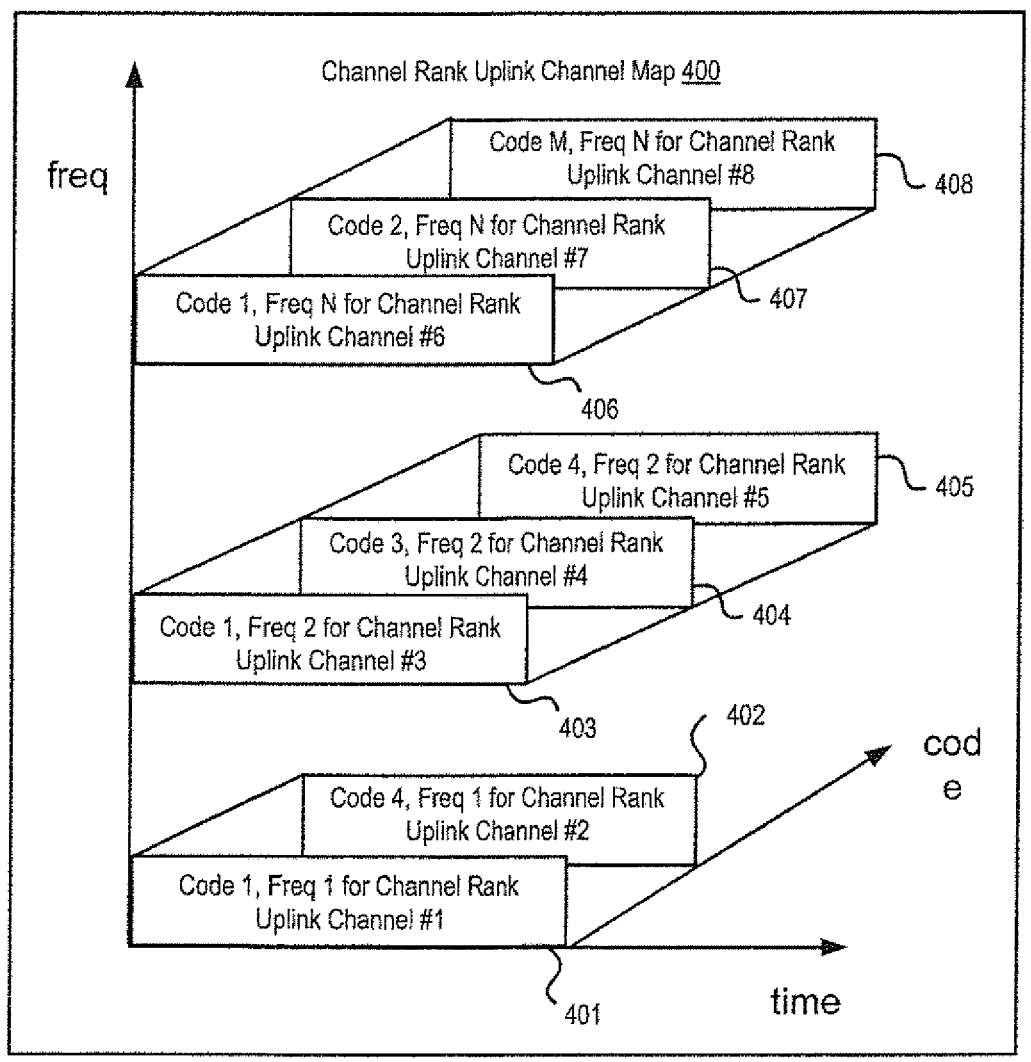
FIG. 4 depicts an example channel rank physical resource map which may be constructed and used at a controller to assign a specific combination of signature sequence, frequency band and/or time interval to each receiver/UE device.

FIG. 4 depicts an example channel rank uplink channel map 400 which may be constructed and used at a controller 310 or UE 320 to specify a channel rank physical resource as a channel rank feedback channel from a particular UE 320 in terms of a specific combination of signature sequence, frequency band and/or time interval. In the depicted channel rank uplink channel map 400, each of eight uplink channels (#1-#8) is assigned a unique combination of signature sequence, frequency band and/or time interval. In particular, the example channel rank uplink channel map 400 uses three dimensions (frequency, code and time) to assign a first code/frequency combination (Code 1, Frequency 1) to channel rank uplink channel #1 at map entry 401, and to assign a second code/frequency combination (Code 4, Frequency 1) to channel rank uplink channel #2 at map entry 402. In addition, a third code/frequency combination (Code 1, Frequency 2) is assigned to channel rank uplink channel #3 at map entry 403, a fourth code/frequency combination (Code 3, Frequency 2) is assigned to channel rank uplink channel #4 at map entry 404, and a fifth code/frequency combination (Code 4, Frequency 2) to channel rank uplink channel #5 at map entry 405. Finally, the map assigns a sixth code/frequency combination (Code 1, Frequency N) to channel rank uplink channel #6 at map entry 406, assigns a seventh code/frequency combination (Code 2, Frequency N) to channel rank uplink channel #7 at map entry 407, and assigns an eighth code/frequency combination (Code M, Frequency N) to channel rank uplink channel #8 at map entry 408.

By constructing and maintaining the map 400 at the base station/controller, channel rank reports that are received over the uplink can be demultiplexed and properly interpreted by the controller to identify which UE devices are feeding back channel rank reports. For example, even though both channel rank uplink channel #1 and channel rank uplink channel #2 are assigned the same frequency (Frequency 1), they have the different code/frequency combinations by virtue of the different assigned codes (Code 1 vs. Code 4). As a result, a channel rank report feedback message from a first UE on a first uplink channel can be multiplexed in the same polling interval response with a channel rank report feedback message from a second UE on a second uplink channel, and the messages can be properly interpreted at the controller by accessing the channel rank uplink channel map 400 to decode the channel rank reports. As suggested by the channel rank uplink channel map 400, it is possible to use only frequency assignments to differentiate between different uplink channels, as shown by the fact that channel rank uplink channel #1, channel rank uplink channel #3 and channel rank uplink channel #6 are distinctly designated in the map on the basis of frequency only. Likewise, it is possible to use only CDMA-type coding assignments to differentiate between different channel rank uplink channels, as shown by the fact that channel rank uplink channel #1 and channel rank uplink channel #2 are distinctly designated in the map on the basis of code only. However, by using code/frequency combinations, more channel rank uplink channels can be readily and uniquely identified.

Referring back to the signal flow shown in FIG. 3, once a UE device 320 receives or derives channel rank physical resource information and determines that a channel rank report needs to be fed back to the controller 310, the user device 320 sends the channel rank report in a feedback message 307 by using the specified channel rank physical resource. Depending on the type of multiplex signaling information used, the channel rank report module 324 uses the multiplex signaling information to feed back the channel rank report in an uplink message 307 that uses the assigned channel rank physical resource. Again, any desired signaling scheme may be used for the feedback message 307, though in an example embodiment, the feedback messages are encoded and sent using the channel rank physical resource (e.g., in a dedicated frequency band of an uplink control channel).

The controller 310 may be implemented in the form of a correlating receiver which receives channel rank reports as feedback message(s) 307 from the UE device(s) 320, where each channel rank report is encoded with unique code/frequency combinations. When the code/frequency combinations are selected to be non-interfering, a plurality of channel rank reports can be multiplexed and serviced together in the same polling time interval using a simple physical layer signaling protocol to detect the presence (or absence) of channel rank reports.

Figure 5:
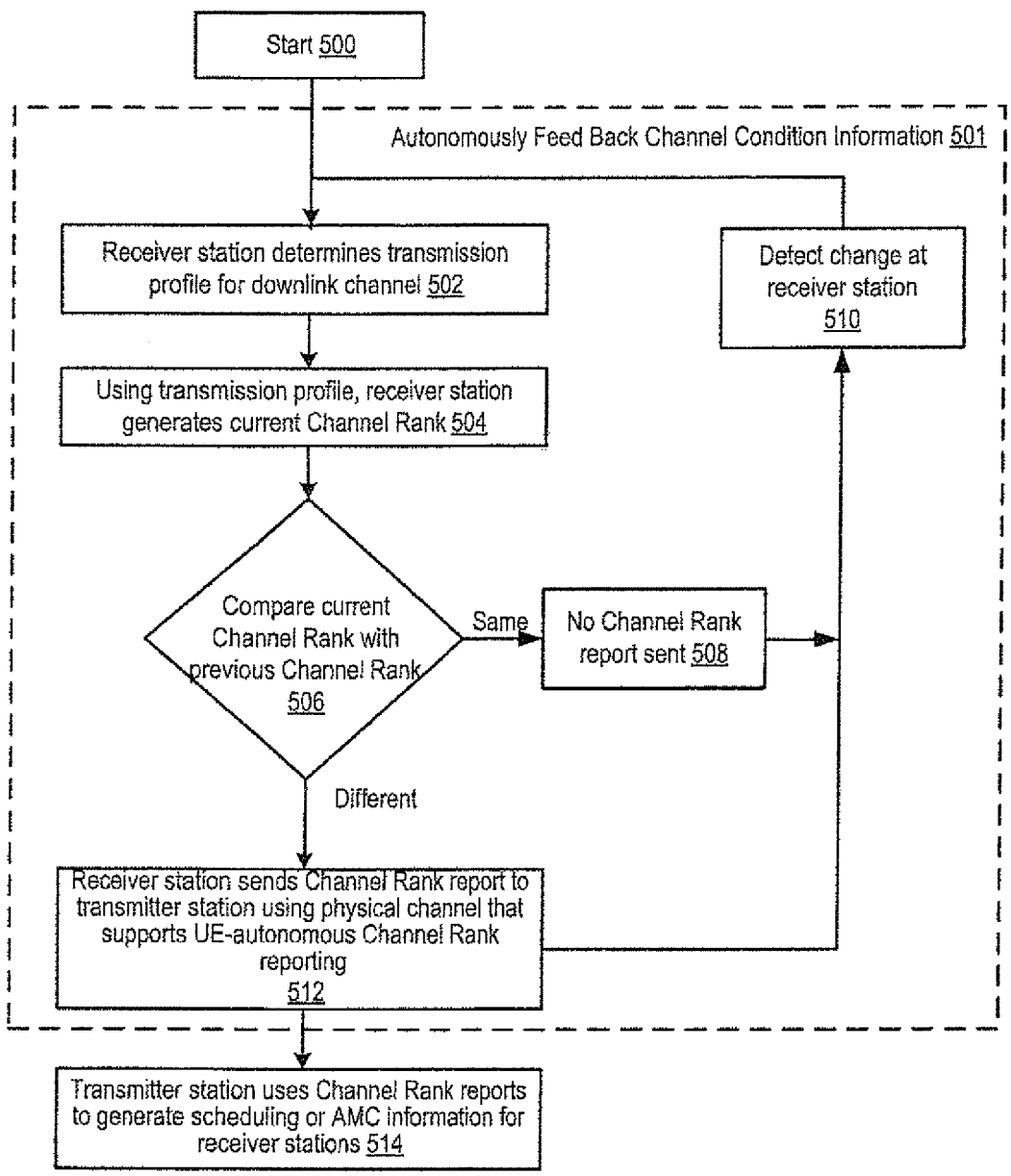
FIG. 5 depicts an example flowchart for autonomously generating and feeding back channel rank data for use in scheduling and AMC coding at a transmitter/base station.

FIG. 5 depicts an example flow for autonomously generating and feeding back channel condition information, such as channel rank data that is used for scheduling and AMC coding at a transmitter/base station. The methodology starts (step 500) by autonomously generating and feeding back channel condition information (step 501) on a non-scheduled basis. A specific example of this step 501 is illustrated in FIG. 5 with reference to an example channel rank feedback flow which begins by determining the transmission profile for the MEMO channel or channel information to a given receiver station by using estimated channel information (step 502). Generally, an estimate of the channel information can be determined by embedding a set of predetermined symbols, known as training symbols, at a transmitter station and processing the training symbols at a receiver station to produce a set of initial channel estimates. In this example, the MIMO transmission channel being estimated at the receiver station may be characterized as a channel matrix H. The singular value decomposition (SVD) of the MIMO channel matrix $H=U\Lambda V^H$, where the matrix U is a left eigen matrix representing the receive signal direction, the matrix $\Lambda$ represents the strength (or gain) of the channel and the matrix V is a right eigen matrix representing the transmit signal direction. However, it will be appreciated that any desired technique may be used to determine the transmission channel profile, and that other profile determination methods can be used for other wireless systems in other embodiments.

Using the transmission profile, the receiver station generates the current channel rank information (step 504). For example, a channel rank value may be generated by using the transmission profile information to access a quantization/codebook which stores an indexed set of possible transmission profiles and/or channel matrices $H_i$ along with associated channel rank information. At this point in the process, the current status of the receiver station (whether represented as quantized channel rank values or otherwise) has been determined. This current status is compared to the previous status of the receiver station (step 506) to see if there has been any change, such as by using a state transition detector circuit or process. In accordance with various embodiments of the present invention, if no change in the receiver status is detected (e.g., by comparing the current channel rank value with a previous channel rank value), the "same" outcome from decision block 506 is taken, in which case there is no channel rank report fed back to the transmitter station (step 508) and the process advances to step 510 where any change in the status of the receiver station is detected. As will be appreciated, the comparison that occurs at step 506 can detect whether there is any change between the current and previous channel rank values, or can detect whether there is any important change between the current and previous channel rank values, such as by using a minimum change threshold to quantify how much change must occur for a change to be detected. On the other hand, if the state transition detector detects a change in the receiver status ("different" outcome from decision block 506), then the receiver feeds back the channel rank report to transmitter (step 512) using a physical channel that supports autonomous channel rank reporting. In various embodiments, the channel rank feedback channel may be implemented as an LTE physical channel that is contention based. Alternatively, the channel rank feedback channel may be implemented by expanding the allocation of an existing synchronized random access channel. At the transmitter station, the channel rank reports are used to generate scheduling or AMC information for receiver stations (step 514), while the receiver station process advances to step 510 where any change in the status of the receiver station is detected. In this way, the process repeats so that the receiver status (e.g., a channel rank report) is fed back to the transmitter station only when the receiver station decides that the feedback is required.

As discussed hereinabove, one of the problems related to channel rank information in MIMO systems is the uncertainty regarding whether a channel rank request sent by a UE is actually received by the Node B. In particular, when a UE feeds back the MIMO channel rank to the Node B, the Node B can override the rank request and transmit to the UE at a lower rank. In this ease, the UE does not know whether there was an error in channel rank feedback, in which case it can resend the rank feedback, or whether the transmitter decided to override the rank request. In embodiments of the present invention, a Node B transmits a channel rank override indicator in the "ON" state to the user in a MIMO channel in the case where it decides to use a different transmission channel rank than the channel rank recommended by the user. If the Node B uses a different channel rank than the recommended rank and indicates no rank override (or does not indicate rank override), the user concludes an error in rank feedback and retransmits rank feedback.

By now it should be appreciated that there has been provided a method and system for processing signals in a communication system by autonomously feeding back channel feedback information on a non-scheduled basis, where the channel feedback information may be channel quality indicator information, rank adaptation information and/or preceding matrix information, or an index representative of any or all of the foregoing. As described, a first receiving device estimates channel state information for a transmission channel from a transmitting device to a first receiving device based on one or more received signals. The first receiving device then uses the channel state information to generate channel feedback information for the transmission channel to the first receiving device. Channel feedback information will be fed back to the transmitting device over a random access uplink channel in response to an autonomous determination by the first receiving device that channel feedback information should be fed back to the transmitting device. In this way, the amount of feedback may be reduced as compared to scheduled feedback systems since the channel feedback information is updated only when there are sufficient changes thereto. In addition, the amount of feedback may be reduced by changing the size of a channel quality indicator report that is transmitted over a random access uplink channel to the transmitting device in response to a determination by the first receiving device that there has been a change in the channel feedback information for the first receiving device. For example, the channel feedback information can be transmitted as data non-associated control information over an uplink scheduling request channel or an LTE random access uplink channel, thereby allowing the channel feedback information to be piggy backed on a data channel portion of a random access uplink channel, or allowing an ACK/NACK signal to be piggy backed on the channel feedback information as data non-associated control information on a random access uplink channel. The first receiving device can autonomously determine that channel feedback information should be fed back by comparing current channel feedback information to previous channel feedback information and/or by detecting when the current channel feedback information exceeds or differs from the previous channel feedback information by a predetermined threshold amount. Alternatively, the first receiving device can autonomously determine that channel feedback information should be fed back by detecting a change in a mode of operation for the first receiving device. An example of such a mode change is switching from a single antenna mode to a two antenna mode. The channel feedback information can be fed back to the transmitting device over a contention-based RACH or a synchronized RACH, such as by using a data non-associated control portion of a single carrier frequency division multiple access (SC-FDMA) uplink channel. Once extracted from the uplink channel at the transmitting device, the channel feedback information may be used to generate signal processing information to transmit data from the transmitting device to said first receiving device over the transmission channel.

In another form, there is provided a receiver for use in a wireless LTE communication system. The receiver includes channel detection logic that is operable to generate channel feedback information from transmission channel state information, where the channel feedback information may be channel quality indicator information, rank adaptation information and/or precoding matrix information, or an index representative of any or all of the foregoing. The receiver also includes transmission logic that is operable to transmit the channel feedback information in response to determining that there has been a change in the channel feedback information for the receiver. The transmission logic determines whether there has been a change in the channel feedback information by comparing current channel feedback information to previous channel feedback information, or by detecting when the current channel feedback information differs from the previous channel feedback information by a predetermined threshold amount. The channel feedback information may be transmitted by the receiver using a synchronized random access channel or contention-based random access channel, such as may be provided in the data non-associated control portion of a single carrier frequency division multiple access (SC-FDMA) uplink channel.

In yet another form, there is provided a method and system for processing signals in a communication system that includes a base station and one or more UE devices, where the base station communicates with each UE device over a respective transmission channel. As described, the base station receives channel feedback information that is autonomously generated by a UE device on a non-scheduled basis, where the channel feedback information may be channel quality indicator information, rank adaptation information and/or precoding matrix information, or an index representative of any or all of the foregoing. In operation, the base station broadcasts to the UE devices a physical resource to be used for feedback of channel feedback information. Subsequently, channel feedback information is fed back to the base station over the uplink channel using the physical resource from a UE device in response to a autonomous determination by the UE device that channel feedback information should be fed back. The channel feedback information can be fed back to the base station over any an random access uplink scheduling request channel or LTE uplink channel, such as a contention-based RACH or a synchronized RACH, by using a data non-associated control portion of a single carrier frequency division multiple access (SC-FDMA) uplink channel. In this way, the channel feedback information can be piggy backed on a data channel portion of an uplink channel, or an ACK/NACK signal can be piggy backed on the channel feedback information as data non-associated control information on a random access uplink channel. Once extracted from the uplink channel at the base station, the channel feedback information may be used to generate signal processing information to transmit data from the base station to said UE device over the transmission channel.

In yet another form, there is provided a multi-antenna transmitter operable to indicate a channel rank override to a UE to indicate that the transmitter has transmitted at a different channel rank than the channel rank recommeded by the UE. Furthermore, embodiments of the invention provide a UE that is operable to decode the channel rank override indication (or the lack of it) according to the following methodology: (a) if the channel rank override indication is sent with value ON, then the UE decodes data according to transmitted channel rank; or (b) if the Node B uses a different channel rank than the UE recommended rank and indicates no rank override (or does not indicate rank override), the UE determines that there is an error in the channel rank feedback transmission and retransmits the channel rank feedback.

The methods and systems for autonomously generating and feeding back channel-side information—such as channel rank information, rank adaptation information or MIMO codebook selection information—in a limited feedback system as shown and described herein may be implemented in software stored on a computer-readable medium and executed as a computer program on a general purpose or special purpose computer to perform certain tasks. For a hardware implementation, the elements used to perform various signal processing steps at the transmitter (e.g., coding and modulating the data, precoding the modulated signals, preconditioning the precoded signals, extracting channel rank reports from the uplink messages and so on) and/or at the receiver (e.g., recovering the transmitted signals, demodulating and decoding the recovered signals, detecting changes in the receiver state that require feedback of channel-side information, and so on) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. In addition or in the alternative, a software implementation may be used, whereby some or all of the signal processing steps at each of the transmitter and receiver may be implemented with modules (e.g., procedures, functions, and so on) that perform the functions described herein. It will be appreciated that the separation of functionality into modules is for illustrative purposes, and alternative embodiments may merge the functionality of multiple software modules into a single module or may impose an alternate decomposition of functionality of modules. In any software implementation, the software code may be executed by a processor or controller, with the code and any underlying or processed data being stored in any machine-readable or computer-readable storage medium, such as an on-board or external memory unit.

Although the described exemplary embodiments disclosed herein are directed to various feedback systems and methods for using same, the present invention is not necessarily limited to the example embodiments illustrate herein. For example, various embodiments of a channel rank feedback system and methodology disclosed herein may be implemented in connection with various proprietary or wireless communication standards, such as IEEE 802.16; 3GPP-LTE, DVB and other multi-user systems, such as wireless MIMO systems, though channel rank information can also be used in non-MIMO communication systems. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A mobile device, comprising:
a processor;
a wireless interface in data communication with the processor; and
logic in data communication with the processor and the wireless interface, the logic configured to cause the mobile device to:
estimate channel information based on at least one received signal;
determine a current channel rank indication based at least on part on the estimated channel information;
compare the current channel rank indication against a previous channel rank indication; and
based at least in part on the comparison, determine whether to transmit channel rank feedback information relating at least in part on the current channel rank indication.

2. The mobile device of claim 1, wherein the logic is further configured to transmit the channel rank feedback information when the current rank indication is different than the previous channel rank indication.

3. The mobile device of claim 1, wherein the logic is further configured to transmit the channel rank feedback information when the current rank indication and the previous channel rank indication differ by at least a predetermined amount.

4. The mobile device of claim 1, wherein the determination of whether to transmit the channel rank feedback information is further based at least in part on a change in a mode of operation of the mobile device.

5. A method of operating a mobile device, the method comprising: determining one or more reception characteristics; determining a current channel rank indication based at least in part on the one or more reception characteristics; evaluating the channel rank current rank indication against a previous channel rank indication; and transmitting feedback information based at least in part on a determination that feedback information is to be provided to a base station, the determination based at least in part on the act of evaluating; wherein the feedback information is at least related to the current channel rank indication.

6. The method of claim 5, wherein feedback information is transmitted based at least in part on a determination that the current rank indication differs from the previous rank indication.

7. The method of claim 5, further comprising:
Determining, subsequent to transmitting the feedback information, a new current rank indication;
comparing the new current rank indication with the current rank indication;
retransmitting the feedback information when the new current rank indication is different than the current rank indication.

8. The method of claim 5, wherein the feedback information is configured to request a change in scheduling and/or adaptive modulation control of signals transmitted to the mobile device by a base station.

9. The method of claim 5, wherein a time for transmitting feedback information is autonomously decided by the mobile device.

10. A non-transitory computer readable apparatus comprising a plurality of instructions configured to enable non-periodic feedback of channel information, where the plurality of instructions, when executed by a processor, cause a mobile device to:
determine a transmission channel profile based at least in part on channel estimate information;
generate a current channel rank information based at least in part on the transmission channel profile; and
transmit feedback channel information when the current channel rank information is determined to be different from a previous channel rank information;
wherein a time for the transmission of the feedback channel illumination is autonomously determined by the mobile device.

11. A base station apparatus, comprising: a processor; at least one wireless interface in data communication with the processor; and logic in data communication with the processor and the at least one wireless interface, the logic configured to cause the base station apparatus to: receive a channel rank request from a mobile device on a non-scheduled basis in response to a determination by the mobile device; and schedule one or more resources for the mobile device based at least in part on the channel rank request; wherein the determination by the mobile device is based at least in part on a detection that a current channel rank request is different than a previous channel rank request.

12. The base station apparatus of claim 11, wherein the logic is further configured to:
   determine whether the scheduled one or more resources for the mobile device corresponds to a rank level associated with the channel rank request; and
   when the scheduled resources do not correspond to the rank level, transmit an override indication to the mobile device, the override indication configured to prevent a retransmission of the channel rank request by the mobile device.

13. The base station apparatus of claim 11, wherein the logic is further configured to maintain a map of a plurality of received channel rank requests from a respective plurality of mobiles devices, the map configured to enable detection and decoding of the plurality of received channel rank requests.

14. The base station of claim 13, wherein each channel rank request is assigned a unique combination of resources for which to use to transmit the respective channel rank request.

15. A method for processing signals in a wireless communications base station, the method comprising: receiving one or more channel rank reports from respective one or more mobile devices; and assigning channel ranks to the one or more mobile devices; wherein the one or more channel rank reports are transmitted by the respective one or more mobiles devices upon a determination by the respective one or more mobile devices that a current channel rank level is different than a previous channel rank level by a predetermined amount.

16. The method of claim 15, further comprising maintaining information relating at least in part to one or more resources used by the one or more devices to transmit the respective one or more channel rank reports.

17. The method of claim 16, wherein the maintained information is configured to allow detection of received one or more channel rank reports.

18. The method of claim 15, further comprising transmitting an override indicator to respective one or more mobile devices when the respective assigned channel rank is different than a channel rank requested via the respective one or more channel rank reports.

19. A non-transitory computer readable apparatus comprising a plurality of instructions for processing non-periodic feedback of channel information, the plurality of instructions, when executed by a processor, cause a base station to: receive a channel rank request from a mobile device, the channel rank request being generated at least partly in response to when a determination is made by the mobile device that a current channel rank level is different than a previous channel rank level by a designated amount.

* * * * *